(12) United States Patent
Hedrick

(10) Patent No.: US 6,346,219 B1
(45) Date of Patent: Feb. 12, 2002

(54) FCC FEED INJECTOR WITH CLOSURE PLUG

(75) Inventor: Brian W. Hedrick, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/197,050

(22) Filed: Nov. 20, 1998

(51) Int. Cl.[7] .............................. F27B 15/08; G01F 1/44; F16K 15/00; F16K 21/04
(52) U.S. Cl. ................ 422/145; 422/139; 422/140; 422/144; 422/147; 137/512; 137/533; 222/531; 222/532; 222/537
(58) Field of Search ................ 422/139–147; 208/127, 146, 148, 153, 158; 138/37, 40, 89, DIG. 11; 73/861.44–861.52, 861.61, 861.63, 861.64; 222/531, 537, 532; 137/533.31, 533.21, 533, 512

(56) References Cited

U.S. PATENT DOCUMENTS

| | | | |
|---|---|---|---|
| 3,071,540 A | 1/1963 | McMahon et al. | 208/163 |
| 4,338,788 A * | 7/1982 | Fink | 60/648 |
| 4,427,538 A | 1/1984 | Bartholic | 208/127 |
| 4,427,539 A | 1/1984 | Busch et al. | 208/127 |
| 4,434,049 A | 2/1984 | Dean et al. | 208/153 |
| 4,479,870 A | 10/1984 | Hammershaimb et al. | 208/164 |
| 4,570,669 A * | 2/1986 | Pauliukonis | 137/528 |
| 4,717,467 A | 1/1988 | Haddad et al. | 208/113 |
| 4,729,825 A | 3/1988 | Nielsen | 208/154 |
| 4,824,557 A * | 4/1989 | Cartmell et al. | 208/146 |
| 4,932,082 A * | 6/1990 | Ridgeway | 4/287 |
| 4,960,502 A | 10/1990 | Holland | 297/85 |
| 5,205,992 A | 4/1993 | van Ommen et al. | 422/140 |
| 5,298,155 A | 3/1994 | Sabottke | 208/157 |
| 5,318,691 A | 6/1994 | Muldowney | 208/113 |
| 5,340,545 A * | 8/1994 | Gartside et al. | 422/146 |
| 5,554,341 A * | 9/1996 | Wells et al. | 422/145 |
| 5,562,818 A | 10/1996 | Hedrick | 208/163 |
| 5,944,982 A * | 8/1999 | Lomas | 208/164 |
| 5,983,927 A * | 11/1999 | Simon et al. | 137/516.27 |

* cited by examiner

*Primary Examiner*—Hien Tran
*Assistant Examiner*—Alexa A. Doroshenk
(74) *Attorney, Agent, or Firm*—John G. Tolomei; James C. Paschall

(57) ABSTRACT

A fluid feed distributor improves particle and feed contacting by using a flow actuated plug to prevent back flow of fluidizable particles through a fluid feed outlet when fluid feed to a riser conduit ceases. The plug is located at or near the bottom of a riser contacting conduit where a back flow of particles can occur. The plug drops into the fluid feed outlet when fluid flow stops. The plug and a supporting stem will usually have an at least partially vertical orientation to provide the preferred gravity closure of the flow actuated plug. The plug arrangement can also provide improved feed distribution. Preferably the fluid actuated plug will act in conjunction with a fluid dispersion device. The dispersion device may be located upstream in a feed conduit that houses the plug and a fluid outlet at its downstream end. In addition, the fluid actuated plug can also serve to adjust the dispersion of feed fluid during operation of the unit. The restricted opening that receives the plug may comprise a spray nozzle that further improves feed dispersion. A restricted opening in the form of a venturi offers particularly advantageous feed distribution benefits when cooperatively arranged with the plug.

19 Claims, 2 Drawing Sheets

FCC FEED INJECTOR WITH CLOSURE PLUG

BACKGROUND OF THE INVENTION

1. Field of the Invention

This invention relates generally to the dispersing of liquids into fluidized solids. More specifically this invention relates to a method and apparatus for dispersing a hydrocarbon feed into a stream of fluidized catalyst particles.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

It has been found that the method of contacting the feedstock with the catalyst can dramatically affect the performance of the reaction zone. Modern FCC units use a pipe reactor in the form of a large, usually vertical, riser in which a gaseous medium upwardly transports the catalyst in a fluidized state. Ideally the feed as it enters the riser is instantaneously dispersed throughout a stream of catalyst that is moving up the riser. A complete and instantaneous dispersal of feed across the entire cross section of the riser is not possible, but good results have been obtained by injecting a highly atomized feed into a pre-accelerated stream of catalyst particles. However, the dispersing of the feed throughout the catalyst particles takes some time, so that there is some non-uniform contact between the feed and catalyst as previously described. Non-uniform contacting of the feed and the catalyst exposes portions of the feed to the catalyst for longer periods of time which can in turn produce overcracking and reduce the quality of reaction products.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets.

U.S. Pat. No. 3,071,540 discloses a feed injection apparatus for a fluid catalytic cracking unit wherein a high velocity stream of gas, in this case steam, converges around the stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles.

U.S. Pat. No. 4,434,049 shows a device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. The combined flow of oil and steam exits the conduit through an orifice which atomizes the feed into a dispersion of fine droplets and directs the dispersion into a stream of flowing catalyst particles.

The injection devices of the '540 and '049 patents rely on relatively high fluid velocities and pressure drops to achieve atomization of the oil into fine droplets. Providing this higher pressure drop burdens the design and increases the cost of equipment such as pumps and exchangers that are typically used to supply liquid and gas to the feed injection device. The need to replace such equipment may greatly increase the cost of retrofitting an existing liquid-solid contacting installation with such an injection apparatus.

U.S. Pat. No. 4,717,467 shows a method for injecting an FCC feed into an FCC riser from a plurality of discharge points. The discharge points in the '467 patent do not radially discharge the feed mixture into the riser.

Another useful feature for dispersing feed in FCC units is the use of a lift gas to pre-accelerate the catalyst particles before contact with the feed. Catalyst particles first enter the riser with zero velocity in the ultimate direction of catalyst flow through the riser. Initiating or changing the direction of particle flow creates turbulent conditions at the bottom of the riser. When feed is introduced into the bottom of the riser the turbulence can cause mal-distribution and variations in the contact time between the catalyst and the feed. In order to obtain a more uniform dispersion, the catalyst particles are first contacted with a lift gas to initiate upward movement of the catalyst. The lift gas creates a catalyst pre-acceleration zone that moves the catalyst along the riser before it contacts the feed. After the catalyst is moving up the riser it is contacted with the feed by injecting the feed into a downstream section of the riser. Injecting the feed into a flowing stream of catalyst avoids the turbulence and back mixing of particles and feed that occurs when the feed contacts the catalyst in the bottom of the riser. A good example of the use of lift gas in an FCC riser can be found in U.S. Pat. No. 4,479,870 issued to Hammershaimb and Lomas.

There are additional references which show use of a lift gas in non-catalytic systems. For example, in U.S. Pat. No. 4,427,538 to Bartholic, a gas which may be a light hydrocarbon is mixed with an inert solid at the bottom part of a vertical confined conduit and a heavy petroleum fraction is introduced at a point downstream so as to vary the residence time of the petroleum fraction in the conduit. Similarly, in U.S. Pat. No. 4,427,539 to Busch et al., a $C_4$ minus gas is used to accompany particles of little activity up a riser upstream of charged residual oil so as to aid in dispersing the oil.

Feed atomization, lift-gas and radial injection of feed have been used to more uniformly disperse feed over the cross-section of a riser reaction zone. As feed contacts the hot catalyst, cracking and volumetric expansion of the hydrocarbons causes an increase in the volumetric rate of fluids passing up the riser. A large portion of this volumetric increase occurs immediately downstream of the feed injection point. U.S. Pat. No. 5,562,818 controls the volumetric expansion occurring simultaneously with mixing of catalyst and hydrocarbon feed to avoid the mal-distribution that can adversely affect the quantity and quality of the products obtained from the cracking reaction by eliminating turbulent back mixing as well as quiescent zones in the riser section immediately downstream of the feed injection point.

Further control of feed atomization has been added by U.S. Pat. No. 5,298,155 and U.S. Pat. No. 5,188,805 that show a movable head in nozzle tip to adjust the flow opening and flow characteristics of multiple orifice nozzles. A movable shaft positions the head at variable locations within the orifice throat of the nozzle as the unit operates.

Feed contacting methods have also focused attention on the distribution of catalyst before it contacts the feed. U.S. Pat. No. 5,318,691 provides an extended contacting chamber for adjustment of the catalyst flow regime before a distributor radially injects multiple streams of hydrocarbon feed to form a catalyst and feed mixture that passes through a restricted opening and then upwardly in a riser contacting conduit. U.S. Pat. Nos. 5,205,992, 4,960,502, and 4,729,825 disclose various additional methods for distributing fluidized particles at the bottom of a riser contacting conduit before the particles contact the feed fluid.

As shown by the above prior art, most feed injection apparatus are located near the bottom of a riser conduit that injects the feed into the riser to begin upward transport of the particles through the riser or injects the feed into the riser after some other motive fluid has initiated transport of the solid particles up the riser. As the complexity of feed distribution devices increases, shut down of the process unit and the unavoidable back flow of catalyst that occurs can interfere with the operation of the feed nozzles when operations resume. In particular, catalyst particles, especially in the presence of any condensed residual fluids or initially entering fluids, can agglomerate and plug the relatively small openings of the vanes and orifices that find common use in today's fluidized particulate processes. Special shutdown procedures can be followed to reduce or eliminate back flow of particles or the presence of particles in the feed distribution devices. However, such procedures may not be possible when an emergency dictates the time frame of a shutdown. Agglomeration that occurs will at least protract start-up time and, in more inconvenient situations, may require time consuming and expensive disassembly of equipment before operations may resume.

SUMMARY OF THE INVENTION

It is an object of this invention to provide a method and apparatus that uniformly injects a well dispersed feed into a well dispersed stream of particles and prevents back flow of particles into restricted feed distribution passages.

It is a further object of this invention to provide a method and apparatus that simplifies the adjustment of feed distribution for changes in fluid feed flow rate during the operation of the fluid solid contacting.

These objects are achieved by the use of a fluid feed distributor that uses a flow actuated plug to prevent back flow of fluidizable particles through a fluid feed outlet when fluid feed to the riser conduit ceases. The apparatus is located at or near the bottom of a riser contacting conduit where a back flow of particles can occur. A key function of the apparatus is the at least occluding, and preferably sealing, movement of the flow actuated plug into the fluid feed outlet when fluid flow stops. The apparatus itself will usually have an at least partially vertical orientation to provide the preferred gravity closure of the flow actuated plug, however, suitable resilient devices may be incorporated to provide back flow prevention in horizontal alignments or where additional assistance to gravity closure is desired.

The arrangement can also provide improved feed distribution. Preferably the fluid actuated plug will act in conjunction with a fluid dispersion device. The dispersion device may be located upstream in a feed conduit that houses the fluid outlet at its downstream end. In addition, the fluid actuated plug can also serve to adjust the dispersion of feed fluid during operation of the unit. To enhance feed dispersion the fluid feed outlet will ordinarily provide a restricted opening. A spray nozzle may be incorporated into the restricted opening to improve feed dispersion. A restricted opening in the form of a venturi offers particularly advantageous feed distribution benefits when cooperatively arranged with the plug.

Whether in a venturi shape or not, the nozzle, the opening and the plug may control flow in two areas. In one section the fluid actuated plug may have a similar profile to a shearing surface of the nozzle opening that produces atomization of the feed. The plug can regulate the area at the exit point of the nozzle to maintain high shear action on the feed with regard to its flow rate. The plug may also act to vary a more upstream portion of the nozzle flow area by using a dependent stem as the plug support. The stem will extend through the opening and taper to decreased diameter at its distal end. Upward movement of the plug caused by increased fluid flow, positions increasingly smaller diameter portions of the stem within the opening, thereby increasing the flow area through the opening. The tapered support stem in this manner can again compensate automatically for low flow situations in order to maintain high shear velocities through the outlet.

Accordingly in one embodiment this invention is an apparatus for contacting fluidizable particles with a fluid feed. The apparatus includes an elongated riser conduit having an upper downstream end and a lower upstream end that defines a fluidized catalyst inlet. At least one feed conduit has an outlet surface at least partially defining a restricted fluid outlet and establishing a flow path for a fluid feed into an upstream portion of the riser. In the upstream portion of the riser the fluid feed passes from a feed conduit inlet through a dispersion device and out of the feed conduit through the restricted fluid outlet. A flow actuated plug moves into contact with the outlet surface of the restricted fluid outlet to occlude the restricted fluid outlet and inhibit particle flow in the absence of fluid flow through the feed conduit.

In another embodiment this invention is an apparatus for contacting fluidizable particles with a fluid feed. The apparatus again includes an elongated riser conduit having an upper downstream end and a lower upstream end that defines a fluidized catalyst inlet. At least one feed conduit has a feed inlet at one end, has a feed outlet forming a venturi at an opposite end for injecting the fluid feed into an upstream portion of the riser, and has at least one guide bar extending radially into an intermediate section of the feed conduit. A flow actuated plug is located at least partially above the venturi and has a larger diameter than the opening of the venturi for sealing the venturi from catalyst flow. A stem depends from the bottom of the flow actuated plug and cooperates with the stop bar to limit upward movement of the self actuated plug.

A preferred arrangement for the apparatus of this invention uses a particle distribution zone to provide good distribution of the particles before contacting the feed. Suitable particle distribution arrangements will neutralize the momentum of the particles as they enter the riser by passing them through an annular zone that extends around the outside of the riser conduit. The primary function of the particle distribution zone is to change the direction of the particles for even distribution over a usually annular distribution space that delivers the particles for contact with the feed. In those embodiments where it is used, the particle distribution zone will usually take the form of a particle distribution vessel located at or near the upstream end of the riser conduit and be in communication with a fluidized particle inlet. The particle distribution vessel will define a particle distribution chamber that communicates with a source of particles, will contain at least one inlet for receiving a fluidizing gas that fluidizes particles for distribution around the chamber, and will define an outlet in communication with the fluidized particle inlet.

Additional objects, embodiments and details of this invention can be obtained from the following detailed description.

DETAILED DESCRIPTION OF THE INVENTION

This invention will be described in the context of an FCC process for the catalytic cracking of hydrocarbons by contact with a fluidized catalyst.

Figure 1:
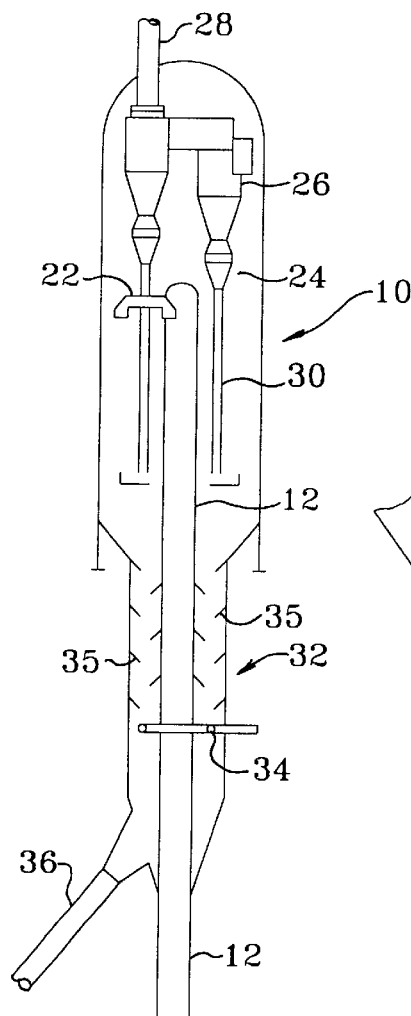
FIG. 1 is a sectional elevation of an FCC reactor and riser.

In a typical FCC process flow arrangement, as depicted by FIG. 1, finely divided regenerated catalyst leaves a regeneration zone (not shown) and contacts a feedstock in a lower portion of a reactor riser zone. FIG. 1 shows a reactor 10 with a vertical riser 20 having an upper section 12 and a lower riser section 14 into which a regenerator standpipe 16 transfers regenerated catalyst from the regenerator (not shown). Feed enters the riser through conduit 17 and a feed distributor 18. A diluent material, typically steam, may also enter the bottom feed distributor 18 through a nozzle 15. While the resulting mixture, which has a temperature of from about 200° C. to about 700° C., passes up through the riser, conversion of the feed to lighter products occurs and coke is deposited on the catalyst. The effluent from the riser is discharged from the top of the riser through a disengaging arm 22 into a disengaging space 24 where additional conversion can take place. The hydrocarbon vapors, containing entrained catalyst, are then passed through one or more cyclone separators 26 to separate any spent catalyst from the hydrocarbon vapor stream.

The separated hydrocarbon vapor stream is passed from an outlet nozzle 28 into a fractionation zone (not shown)—known in the art as the main column—wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams.

The separated spent catalyst from cyclones 26 passes into the lower portion of the disengaging space 24 through dip legs 30 and eventually passes out of the reaction zone passing into a stripping zone 32. A stripping gas, usually steam, enters a lower portion of zone 32 through a distributor ring 34 and contacts the spent catalyst, purging adsorbed and interstitial hydrocarbons from the catalyst. A series of baffles 35 in the stripping zone improves contact between the catalyst and stripping gas.

The spent catalyst, containing coke, leaves the stripping zone 32 through a reactor conduit 36 and passes into the regeneration zone where, in the presence of fresh regeneration gas and at a temperature of from about 620° C. to about 760° C., combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and in repetition of the previously mentioned cycle, contacts the feedstock in the reaction zone.

Catalysts that can be used in this process include those known to the art as fluidized catalytic cracking catalysts. Specifically, the high activity crystalline aluminosilicate or zeolite-containing catalysts can be used and are preferred because of their higher resistance to the deactivating effects of high temperatures, exposure to steam, and exposure to metals contained in the feedstock. Zeolites are the most commonly used crystalline aluminosilicates in FCC.

Figure 2:
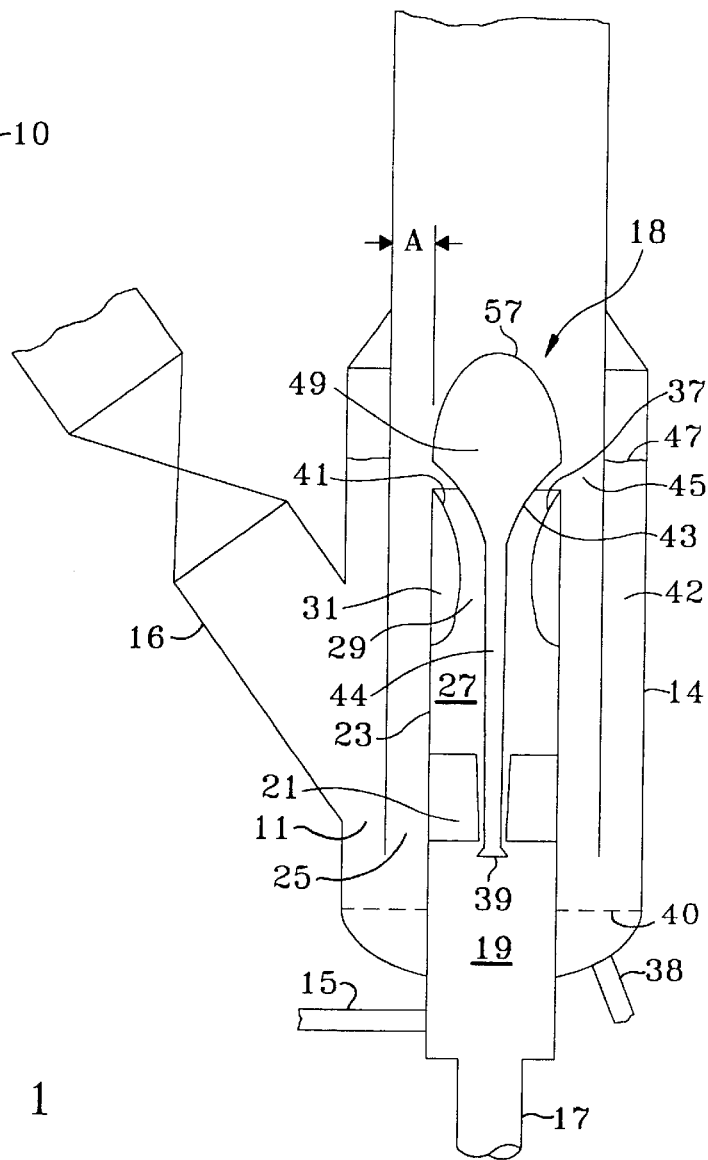
FIG. 2 is an enlarged section of the lower end of the riser shown in FIG. 1.

As more clearly shown in FIG. 2, the lower section 14 of the riser provides a catalyst distribution zone in the form of an annular space 11 defined in part as the volume to the outside of a feed conduit 23. Catalyst entering annular space 11 preferably forms a dense catalyst bed. A fluidizing medium enters the bottom of annular space 11 through a line 38 and contacts the catalyst entering through line 16 to form a dense bed of catalyst 42 having an upper surface 47. The term dense bed refers to a region of catalyst having a density of at least 20 pounds per cubic foot. In order to increase the uniformity of the dense bed, the fluidizing medium passes through a distribution plate 40 before contacting the catalyst. The dense bed zone is also termed a bubbling bed which provides good mixing of the catalyst and a uniform suspension of catalyst around a fluidized particle inlet 25 located at the bottom of riser conduit 20. The fluidized particle inlet 25 also serves as an outlet for the catalyst distribution zone.

This invention does not require a specific gas composition for the fluidizing medium. Steam can serve as a suitable fluidizing medium. The fluidizing medium can also comprise a typical lift gas and can be used by itself or in combination with steam. Lift gas typically includes not more than 10 mol % of $C_3$ and heavier hydrocarbons. In addition to hydrocarbons, other reaction species may be present in or comprise the fluidizing mediums such as $H_2$, $H_2S$, $N_2$, CO and/or $CO_2$.

Whatever type of fluidizing medium is used in the dense bed the low gas velocity through the dense bed zone requires very little fluidizing medium. Thus, in addition to the dense bed conditions providing good mixing of the catalyst and distribution of the catalyst around inlet 25, it also minimizes the amount of fluidizing medium needed prior to the injection of the feed. Preferably the gas velocity through the bed is kept very low, in most cases at a rate of 2 feet per second or less. In the case of steam, the fluidizing medium will range between 0.2 and 0.5 wt %. Such low fluidizing medium rates represent a ten fold decrease over that currently used in feed distributors. Nevertheless, low gas flow is sufficient to maintain the dense bubbling bed conditions throughout the volume of catalyst located in annular area 11.

Fluid feed from conduit 17, and any additional fluidizing medium from conduit 15, pass upwardly through a mixing chamber 19 of feed conduit 23. The feed passes from mixing chamber 19 through a plurality of fins 21 that act as a series of vanes to provide additional mixing of the fluid feed and any fluidizing medium. The mixed fluid passes upwardly through a chamber 27 into a restricted opening 29 provided in part by a venturi 31.

A plug 49 and venturi 31 define the restricted opening for fluid flow out of distributor 18. Drag forces and pressure drop from the fluid flow lift plug 49 upwardly from a contact surface 37 located toward the top of venturi 31. A support rod 44 depends from plug 49. An upset end 39 at the bottom of support rod 44 can act as a stop and limit upward movement of plug 49. An outlet 41 discharges the mixture of feed and any additional fluid, into contact with the catalyst in an upper section 45 of the annular area 11.

The venturi and plug arrangement add feed distribution to any initial mixing of the feed that takes place in conduit 23. The outlet 41 of the restricted opening 29 disperses the feed to provide a distribution of fine droplets. Before exiting restricted opening 29 the feed undergoes a change of direction by contact with a lower surface 43 of plug 49. Tracing then the fluid feed flow path, the feed first flows first into chamber 19 in an axial direction and passes next through the fins 21 that provide an additional dispersion device by mixing the fluid feed with any fluidizing medium. As the feed reaches the restricted opening 29 it contacts the plug 49 which changes the direction of the feed thereby imparting a shearing action on the particles in the feed and producing the droplets that are ejected from outlet 41.

The dispersion of the feed into yet finer droplets is promoted by imparting sufficient energy into the liquid. Where desired any of the prior art methods may be used in combination with the feed injection arrangement of this invention. In most cases, this invention will be practiced with the addition of a diluent such as steam to the feed before discharge through restricted opening 29. The feed entering the feed conduit 17 will usually have a temperature below its initial boiling point but a temperature above the boiling point of any steam or gaseous hydrocarbons that enter the distribution device along with the liquid. A minimum quantity of gaseous material equal to about 0.2 wt. % of the combined liquid and gaseous mixture, is typically commingled with the liquid entering the chamber 19. The gaseous material may be injected into the chamber 19 in any manner.

As the gaseous medium and liquid, usually steam and hydrocarbons, enter the distribution device, they tend to remain segregated. Therefore, this invention may benefit from the preferred passing of the mixture through a mixing device such as the vanes provided by fins 21 that blend the hydrocarbon and any gas into a relatively uniform hydrocarbon and gas stream. By substantially uniform, it is meant that any major segregation between the liquid and gaseous component that would tend to deliver more liquid or gaseous medium to one section or another of the circumferential port is eliminated. This blending is typically mild and normally will add a pressure drop of less than 20 psi to the system.

The preceding description explains a variety of ways in which to promote the atomization of feed to a desired degree. Therefore the size of restricted opening 29 is not restricted by atomization requirements. The width of restricted opening 29 may be sized to achieve the desired velocity or range of velocities for the feed as it enters the upper portion 45 of annular space 11. Typically plug 49 will be sized and balanced to provide an opening 29 with a width from about ¼" to 1".

Upward movement of plug 49 may be limited by flow and mechanical means. For example, increased flow area has a substantial self-limiting effect on the movement of plug 49. Once the fluid drag force and pressure drop across plug 49 equals the apparent weight of the plug, the plug will rise until the flow induced forces balance with the gravity induced force to suspend the plug 49 in a stable position. Since the flow of fluid around the plug must increase geometrically to sustain linear increments in the plug elevation, higher flow rates will have a decreasing tendency to raise plug 49. Pressure drop across the restricted opening 29 can also be tailored to have a decreasing effect on elevation of plug 49 through the use of the depicted tapered stem 44. Increasing elevation of the plug 49 raises the elevation of the stem and increases the flow area thereby further reducing the pressure drop from chamber 27 into the open section of the riser. Furthermore, the fins 21 can also act as a stop member to engage the upset end 39 of stem 44 and thereby provide a positive limit on the upward movement of plug 49 that sets a maximum size to outlet 41.

The width of the annular upper portion area 45 for initial contact of the feed from outlet 41 with the catalyst is shown by dimension "A" in FIG. 2. Preferably this passage will have a width of less than 8 inches and more preferably a width of less than 6 inches. The narrow transverse width of this feed-catalyst contact zone insures good contact of the feed with the catalyst by allowing the feed to penetrate all or substantially all of the transverse width of the feed and catalyst contact zone. Rapid and thorough mixing between the feed and catalyst is also promoted by the use of outlet the extended circumferential form of outlet 41 port 46 around the circumference of feed conduit 23.

The selection of width "A" is dependent upon the velocity and momentum of the feed as it exits outlet 41. Plug 49 and opening 29 are usually sized to provide a fluid velocity out of outlet 41 in a range of from 6 to 30 feet per second and preferably in the range of 10 to 20 ft/sec. In accordance with typical FCC practice the feed exits outlet 41 as a spray. Droplet size within the spray and the velocity of the spray determines momentum of the feed as it crosses upper portion 45 of annular space 11. It is difficult to increase the momentum of the feed above a given level since the velocity of the feed injection is inversely proportional to the size of the droplets in the emanating spray. Higher velocities for the spray tend to directly increase the momentum of the spray but indirectly decrease the momentum by reducing the size of the exiting droplets. Conversely the reduced momentum that results directly from lower spray velocities is offset by the typical production of larger droplets. Therefore minimizing the width of upper section 45 offers the most effective way to increase the penetration of the feed into the flowing catalyst. A reduced width of upper portion 45 also permits smaller droplets to more fully contact the entire flowing volume of catalyst.

Following mixing and ejection, contact of the feed with the hot catalyst creates a volumetric expansion from both the vaporization of liquid hydrocarbons and heating of the vapor as well as cracking of the hydrocarbons into lower molecular weight species. Preferably this invention controls the flowing cross-sectional area of the feed and catalyst downstream of the catalyst and feed mixing zone. This control provides a gradual and continuous increase in the flowing cross-section area for the catalyst and feed mixture. Gradually increasing the flowing cross-sectional area prevents abrupt changes in the velocity of the stream and the resulting turbulent or quiescent zones that introduce variations in the feed and catalyst contact time thereby preventing uniform catalyst and feed contacting. As the catalyst leaves the restrictive flow area of the feed and catalyst contact zone, it is preferably accelerated to about 35 to 40 feet per second as the reaction begins. Catalyst and gas velocity through the acceleration zone will usually range from 40 to 65 feet per second. The gas velocity in the acceleration zone may be controlled to a limited degree by varying the geometry of the downstream surface 57 of plug 49. A longer and more gradual taper on the downstream surface 57 will produce a more uniform increase in velocity. Preferably surface 57 will provide a taper length through the acceleration zone of from 3 to 8 feet.

Figure 3:
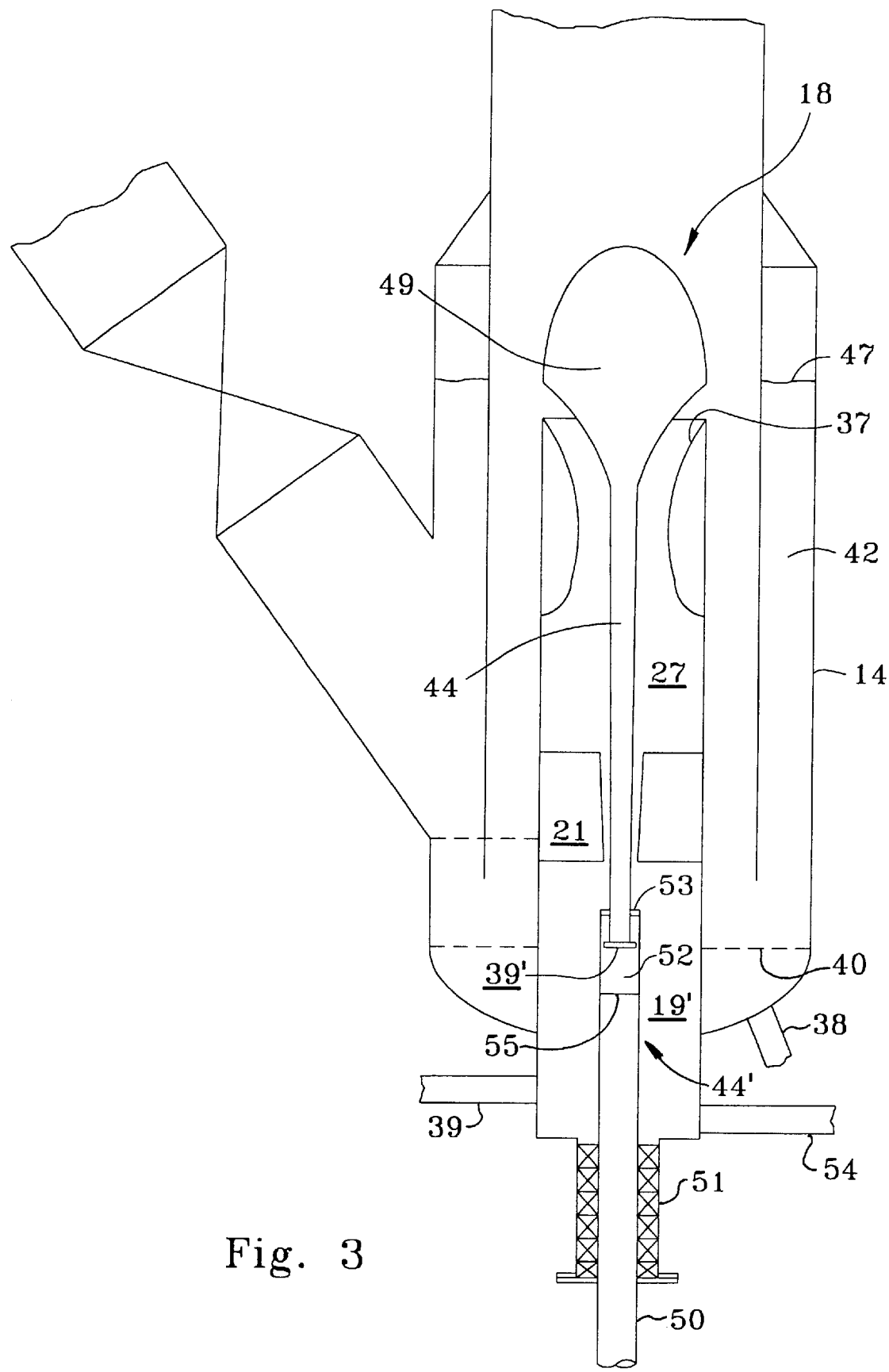
FIG. 3 is shows a modified form of the lower end of the riser shown in FIG. 2.

Additional positive limits on the movement of plug 49 may be provided by the modified stem arrangement 44' as depicted in FIG. 3. The flow dynamics of the plug 49 depicted in FIG. 3 operate in essentially the same manner as those previously described. A modified chamber 19' in FIG. 3 houses a control shaft 50 that is part of a controller (not shown). Control shaft 50 extends from an external controller through a suitable guide and packing gland 51 into the chamber 19'. The inner end of shaft 50 has a hollow interior space 52 that retains an upset end 39' of tapered rod 44'. Withdrawal of rod 50 from chamber 19' brings an upper stop member 53 into contact with upset end 39'. Therefore, withdrawal of rod 50 can force plug 49 downwardly against the upwardly flowing feed which, in modified chamber 19', enters through a line 54. The interior of chamber 52 has an axial length that will—under normal circumstances—prevent upset end 39' from contacting a bottom stop surface 55 so that plug 49 remains free at all times to drop downwardly against contact surface 37 and inhibit catalyst back flow into chambers 27 and 19' when fluid flow ceases. For use in unusual circumstances, control rod 50 may be given sufficient insertion length into chamber 19' to cause stop surface 55 to contact upset end 39'. The use of the control rod in this manner can positively dislodge plug 59 in the event that plug 49 is believed to have become stuck or jammed.

What is claimed is:

1. An apparatus for contacting fluidizable particles with a fluid feed, said apparatus comprising:
    an elongated riser conduit having an upper downstream end and a lower upstream end that defines a fluidized catalyst inlet;
    at least one feed conduit having an outlet surface at least partially defining a restricted fluid opening and establishing a flow path for a fluid feed into an upstream portion of the riser wherein the fluid feed passes from a feed conduit inlet through a dispersion device and out of the feed conduit through the restricted fluid opening; and a flow actuated plug which moves into contact with the restricted fluid opening of the outlet surface of the at least one feed conduit to inhibit flow of fluidizable particles when fluid flow through the feed conduit drops below a predetermined level and which moves out of contact with the restricted fluid opening in the presence of fluid flow through the feed conduit, the restricted fluid opening comprising a venturi with a lower portion of the flow actuated plug having a shape matching a portion of the venturi such that, in the presence of fluid flow, the venturi disperses the feed, through shearing action, in the form of fine droplets, into the fluidizable catalyst.

2. The apparatus of claim 1 wherein the flow actuated plug has a downwardly dependent stem that extends through the restricted fluid outlet.

3. The apparatus of claim 2 wherein the flow actuated plug has a stop that engages a stop member within the feed conduit to limit upward movement of the plug.

4. The apparatus of claim 3 wherein the stop comprises an upset end at a bottom of the stem that engages at least one inwardly extending fin.

5. The apparatus of claim 4 wherein the fin comprises a plurality of vanes for imparting a tangential velocity to the fluid feed.

6. The apparatus of claim 2 wherein the stem has a diameter which decreases downwardly along the stem to provide an increased flow area through the restricted fluid opening as the stem is elevated relative to the opening.

7. The apparatus of claim 1 wherein the restricted fluid outlet comprises a spray nozzle.

8. The apparatus of claim 1 wherein a controller limits upward movement of the flow actuated plug.

9. The apparatus of claim 8 wherein the flow actuated plug has a downwardly dependent stem that extends through the restricted fluid opening and into functional engagement with a movable control rod of an external controller, the rod including a stop member for limiting upward movement of the stem.

10. The apparatus of claim 1 wherein a lower portion of the flow actuated plug and a contact surface therefor define an extended circumferential port therebetween for discharging the fluid feed into contact with the flow of fluidizable particles.

11. An apparatus for contacting fluidizable particles with a fluid feed, the apparatus comprising:

an elongated riser conduit having an upper downstream end and a lower upstream end that defines a fluidized particle inlet;

a particle distribution vessel located proximate the upstream end of the riser conduit and communicating with the fluidized particle inlet, wherein the particle distribution vessel defines a particle distribution chamber, communicates with a source of the particles, contains at least one inlet for receiving a fluidizing gas that fluidizes the particles for distribution around the chamber, and defines an outlet in communication with the fluidized particle inlet;

at least one feed conduit having an outlet surface at least partially defining a restricted fluid opening and establishing a flow path for a fluid feed into an upstream portion of the riser wherein the fluid feed passes from a feed conduit inlet through a dispersion device and out of the feed conduit through the restricted fluid opening; and a flow actuated plug which moves into contact with the restricted fluid opening of the outlet surface of the at least one feed conduit to inhibit particle flow when fluid flow through the feed conduit drops below a predetermined level and which is moved out of contact with the restricted fluid opening by fluid flow through the feed conduit above the predetermined level.

12. The apparatus of claim 11 wherein the flow actuated plug has a downwardly dependent stem that extends through the restricted fluid opening.

13. The apparatus of claim 12 wherein the stop comprises an upset end at a bottom of the stem that engages at least one inwardly extending fin.

14. The apparatus of claim 12 wherein the stem has a diameter which decreases downwardly along the stem to provide an increased flow area through the restricted fluid opening as the stem is elevated relative to the opening.

15. The apparatus of claim 11 wherein the flow actuated plug has a stop that engages at least one stop member within the feet conduit to limit upward movement of the plug.

16. The apparatus of claim 11 wherein the restricted fluid opening comprises a venturi and a lower cooperating portion of the flow actuated plug has a shape that matches a portion of the venturi.

17. The apparatus of claim 11 wherein a controller limits upward movement of the flow actuated plug.

18. The apparatus of claim 17 wherein the flow actuated plug has a downwardly dependent stem that extends through the restricted opening and into functional engagement with a movable control rod of an external controller the rod including a stop member for limiting upward movement of the stem.

19. An apparatus for contacting fluidizable particles with a fluid feed, said apparatus comprising:

an elongated riser conduit having an upper downstream end and a lower upstream end that defines a fluidized catalyst inlet;

at least one feed conduit having a feed inlet at one end, a feed outlet forming a venturi at an opposite end for injecting the fluid feed into an upstream portion of the riser; and at least one fin extending radially into the feed conduit at a position between the feed inlet and the feed outlet; and, a flow actuated plug located at least partially above the venturi and having a larger diameter than that of an opening of the venturi for sealing the venturi from catalyst flow wherein a stem depends from the bottom of the flow actuated plug and the stem cooperates with the fin to limit upward movement of the flow actuated plug.

* * * * *